United States Patent [19]

Kiesel et al.

[11] Patent Number: 5,383,815
[45] Date of Patent: Jan. 24, 1995

[54] AIR CONDUIT ARRANGEMENT FOR THE VENTILATION OR AIR CONDITIONING OF THE INTERIOR OF A VEHICLE AND METHOD FOR PRODUCING AN AIR CONDUIT ARRANGEMENT

[75] Inventors: Gerd H. Kiesel, Neiber; Wilfried Blume, Hanover; Dieter Meyer, Wedemark, all of Germany

[73] Assignee: Beneform GmbH, Germany

[21] Appl. No.: 12,162

[22] Filed: Jan. 28, 1993

[30] Foreign Application Priority Data

Jan. 28, 1992 [DE] Germany ............................... 4202256

[51] Int. Cl.6 ........................ B60H 1/26; B61D 27/00
[52] U.S. Cl. ..................................... 454/137; 454/107; 454/906
[58] Field of Search .................. 138/149, 155; 454/76, 454/78, 107, 108, 109, 137, 143, 144, 906

[56] References Cited

U.S. PATENT DOCUMENTS

| 1,982,125 | 11/1934 | Stacey, Jr. et al. | 454/108 |
| 2,220,587 | 11/1940 | Strobell | 454/108 |
| 4,432,213 | 2/1984 | Katahira et al. | 454/137 X |
| 4,807,523 | 2/1989 | Radtke et al. | 454/137 |

FOREIGN PATENT DOCUMENTS

| 2839571 | 3/1980 | Germany | 454/137 |
| 84/00520 | 2/1984 | WIPO | 454/137 |

*Primary Examiner*—Harold Joyce
*Attorney, Agent, or Firm*—Cushman, Darby & Cushman

[57] ABSTRACT

An air conduit arrangement for ventilating or air conditioning of a vehicle interior, which is supplied with multi-layered, preformed panel elements.

In this arrangement, the air conduits are bordered in the area of the panel elements by two wall sections which are glued together in a permanently resilient manner by means of a connecting flange. Of these, respectively one wall section is formed by the panel element itself and the other wall section by a separate thermoplastic preformed part disposed on the back of the panel element.

22 Claims, 1 Drawing Sheet

AIR CONDUIT ARRANGEMENT FOR THE VENTILATION OR AIR CONDITIONING OF THE INTERIOR OF A VEHICLE AND METHOD FOR PRODUCING AN AIR CONDUIT ARRANGEMENT

BACKGROUND OF THE INVENTION

The invention relates to an air conduit arrangement for ventilating or air conditioning a vehicle interior, which is supplied with multi-layered, preformed panel elements (10), wherein a decorated side (12) of the panel elements (10) faces the vehicle interior and a back (14) with fastening elements faces the body wall.

Air conduit arrangements, through which fresh air or conditioned air is brought to individual passengers seats, are already being employed in vehicles with large interiors, such as ships, aircraft or buses. In most cases there are outlet openings in the ceiling panels above the seats, to which flexible hoses are brought from a central ventilation or an air conditioner. In these case the hoses are disposed hidden behind the paneling.

In smaller vehicles, in particular passenger cars, the outlet openings for air or conditioned air are located in the dashboard. Here, too, the air conduits can be embodied in the form of hoses, which are attached hidden behind the frame of the dashboard, or they can be molded as thermoplastic preformed parts which are friction-welded to other thermoplastic preformed parts of the frame of the dashboard. However, the dashboard does not represent a panel element, but a functional element.

To make it possible in small vehicles, for example mini buses, to provide a better supply of air or conditioned air to the seats, it would be desirable to supply it via air conduits to openings in the paneling, such as is known in connection with the above mentioned vehicles with large interiors. However, in this case there is the problem that to provide within comparatively small exterior dimensions as spacious as possible an interior, the panel elements are attached very closely to the body, because of which the space remaining between them is very narrow. Thus, in most cases it is not possible to house air conduit arrangements of the previously discussed type which would still fit into the space between the panel elements and the body.

SUMMARY OF THE INVENTION

It is the object of the invention to provide an air conduit arrangement for the ventilation and air conditioning of the interior of a vehicle with which effective ventilation is attained without the interior being undesirably reduced by too large distances of the panel elements from the vehicle body.

In an air conduit arrangement for ventilating or air conditioning a vehicle interior, which is supplied with multi-layered, preformed panel elements (10), wherein a decorated side (12) of the panel elements (10) faces the vehicle interior and a back (14) with fastening elements faces the body wall. This object is attained by means of the following features: the air conduits (16) are bordered completely by two wall sections which are glued together in a permanently resilient manner by means of a connecting flange (52) in the area of the panel elements, preferably the area of the interior vehicle roof lining, respectively one of the wall sections being formed by the panel element (10) itself and the other wall section by a separate thermoplastic preformed part (18) disposed on the back (14) of the panel element (10), and the panel element (10) can be fastened with the separate, permanently resiliently glued thermoplastic preformed part (18) in the form of a preformed air conduit element to a body wall of the vehicle interior.

With the invention, the panel elements are also used for the formation of air conduits. In this case they form the peripheral wall of the conduits oriented toward the vehicle interior, while the other peripheral walls are shaped by a thermoplastic preformed part which is placed on the rear side, i.e. the side opposite the decorated side, of the panel elements. It is achieved by means of a permanently resilient gluing of the wall parts that, on the one hand, production tolerances can be compensated and, on the other hand, mechanical changes such as occur because of heat expansion or aging, are also compensated.

The prerequisites for providing a very large cross section of the air conduits are created by means of the design of the air conduits in accordance with the invention without it being necessary to maintain too large a distance between the panel elements and the vehicle body. This large cross section can be achieved in that, with a distance between the panel elements and the body wall customary in vehicles up to now, the air conduits are embodied to be correspondingly wide.

Furthermore, it is possible to prefabricate the air conduits together with the production of the panel elements, so that the air conduits are already present at the required locations during the subsequent attachment of the panel elements to the vehicle interior.

The thermoplastic preformed part preferably consists of a material impervious to air and vapor, such as acryl-butadiene-styrene (ABS) and the panel element has on its back a foil impervious to air and vapor, such as polyethylene (PE). The panel element is either additionally coated with this foil or the foil is already an integral part of the panel element. The permanently resilient adhesive holding the wall parts together consists of an airtight rot-proof material, preferably of a humidity cross-linking polyurethane.

By means of this step it is assured, on the one hand, that all of the conveyed air reaches the air openings in a directed manner, i.e. that no air at the sides escapes at places where it would be lost to the effective ventilation of the interior, in particular of the area of the seats. On the other hand, it is prevented that, with considerable temperature differences between the air used for ventilation or air conditioning and the panel elements or the thermoplastic preformed part, vapor particles penetrate the material and settle on the body or the panel elements in the form of condensation water. It is further prevented, that damage to the material, mold formation, color changes or bad odors are created by the penetration of such moisture into the panel elements.

A further embodiment provides that the thermoplastic preformed part supports an additional insulation mat on the exterior for sound and heat insulation, which is glued together with the preformed part and the panel element, and that a sound and heat insulating layer is formed on the side of the panel element by means of a foamed-on support core in the interior of the multi-layered panel element.

This insulation sees to it that the air conveyed through the air conduit arrangement retains its temperature until it reaches the air outlets and provides effective cooling or heating at the exit point. Also, the generation of condensation water, particularly on cold surrounding parts, such as the body metal during cool outside temperatures or on the exterior of the air conduit arrangement with warm outside temperatures, is prevented. At the same time the sound insulation sees to it that possibly generated flow noises in the interior of the air conduit arrangement are not transmitted to the inside via the body or the paneling.

The air conduit preferably terminates in air outlets which have been recessed in the panel element.

In this way the air can be brought to the air outlets without additional connecting pieces, because of which on the one hand the mechanical effort is reduced, and on the other hand flow noises, such as could occur with changes in the contour or cross section of the air conduit, are prevented.

When a plurality of spatially separated air outlets are present, the air conduits branch off a common main conduit into side conduits. The air conduits have a conduit cross section which, in the case of the side conduits, approximately corresponds to the opening cross section of the associated air outlets and, in the case of the main conduits, approximately corresponds to the sum of the opening cross sections of the associated air outlets.

Because of this, constant flow and pressure conditions are assured in the air conduit, by means of which the amount of air leaving the individual air outlets can also be kept constant. If, for example, all air outlets are opened, they are all equally provided with air, i.e. there is no preference for the air outlets located at the beginning of the air conduit arrangement.

It is furthermore provided that air guide baffles are disposed in the main conduits ahead of the branching of the side conduits, which are formed out of the thermoplastic preformed part.

By means of this design the even supply of air is further improved. The air guide baffles see to it that the amount of air is already distributed in accordance with the conduit cross section at an early time ahead of the branching. The flow is quieted by this and noise-generating turbulences are avoided.

It is furthermore provided that the air conduits have flat rectangular conduit cross sections of constant depth. Their width is graduated in accordance with the number of associated air outlets.

By means of this step the space available between the panel element and the body is optimally used for housing the conduits. Thus, the required conduit cross section is provided over the width of the profile at a predetermined depth.

In accordance with a first alternative, the thermoplastic preformed part has a U-shaped profile which is closed off by the panel element.

Thus, in this embodiment the panel element can form a flat surface, so that parts protruding into the vehicle interior are being avoided. On the other hand, however, an appropriately U-shaped preformed part with flanges is required with this embodiment.

Another alternative provides that the panel element is U-shaped in the area of the air conduits and is closed off by a flat thermoplastic preformed part.

With this it would be possible to attach the panel element partially directly, i.e. not at a distance, to the body and to provide an appropriate bulge protruding into the vehicle interior only in the area of the air conduits. The design of the preformed part can be considerably simplified by this.

In a practical embodiment, the air outlets are disposed in beads or troughs formed in the walls of the panel element and are provided with closable nozzles.

By means of this it is possible to achieve that the direction in which the air flow coming from the air conduits enters the vehicle interior is already determined by the inclination of the wall areas of the beads or troughs. This makes it possible to omit a special plastic design of the nozzles and in this way reduces the danger of accidents because of parts protruding from the panel element.

The thermoplastic preformed part can consist of a plurality of assembled individual parts, which are connected with each other at bushing-like moldings.

In this way it is possible to use standard parts for differing vehicle types. This contributes considerably to savings in tool expenses and makes it possible to use the air conduit arrangement in accordance with the invention also with vehicles which are produced in comparatively small numbers.

In a further embodiment, tacking points made of a quicksetting glue are provided in addition to the permanently resilient adhesive bead.

This makes possible an increase in production accuracy and in this way, in the later, installed state, increased assurance against the appearance of leaks, material fatigue and breaks or rattling noises. It is achieved by means of the tacking points that during the assembly of the panel element and the preformed part the still fresh adhesive layer can set without an undesirable dislocation between the two parts occurring during this process.

A practical embodiment provides that the thermoplastic preformed parts serve as spacers for snap connections with the vehicle body.

Because of this it is possible, on the one hand, to save additional spacers, on the other hand fastening of the panel elements takes place on those parts which have the greatest material mass. Because of this, oscillations and material fatigue and breaks occurring as a result can be assuredly prevented. Furthermore, the additional insulating layer comes to rest against the body which also contributes to the prevention of body oscillations and drumming.

The invention also relates to a method for producing an air conduit arrangement wherein a thermoplastic preformed part is coated with a slow-drying permanently resilient adhesive on its connecting flange; that subsequently the preformed part is placed prepositioned on the back of a panel element and is end-positioned in three axes and fixed.

In this respect its object is to provide a method which allows an airtight, resilient connection between two parts to be joined, in short production cycles.

This object is attained in a method for producing an air conduit arrangement for ventilating or air conditioning a vehicle interior, which is supplied with multi-layered, preformed panel elements (10), wherein a decorated side (12) of the panel elements (10) faces the vehicle interior and a back (14) with fastening elements faces the body wall. This object is attained by means of the following features: the air conduits (16) are bordered completely by two wall sections which are glued together in a permanently resilient manner by means of a connecting flange (52) in the area of the panel elements, preferably the area of the interior vehicle roof lining, respectively one of the wall sections being formed by the panel element (10) itself and the other wall section by a separate thermoplastic preformed part (18) disposed on the back (14) of the panel element (10), and the panel element (10) can be fastened with the separate, permanently resiliently glued thermoplastic preformed part (18) in the form of a preformed air conduit element to a body wall of the vehicle interior. In the method a thermoplastic preformed part is coated with a slow-drying permanently resilient adhesive on its connecting flange; subsequently the preformed part is placed prepositioned on the back of a panel element and is end-positioned in three axes and fixed.

By means of the slow-drying, permanently resilient adhesive it is possible first to place the parts roughly positioned on top of each other and to position them exactly thereafter, wherein the slow drying property of the adhesive is used for making possible additional small dislocations of the parts to be connected with each other. Following setting, this adhesive retains permanent resilient properties, because of which it is possible to compensate tolerance and small relative movements between the joined parts, based on heat expansion or mechanical stresses. It is then achieved by means of the fixation that the finally positioned parts can retain their relative positions during the subsequent setting time of the permanently resilient adhesive.

A further embodiment provides that the preformed part is fixed on the panel element at tacking points disposed along the connecting flange.

These tacking points see to it that the adhesive surfaces of the permanently resilient adhesive are maintained in their final position for setting, even if subsequently placed in intermediate storage.

The tacking points are preferably formed by a quick-setting adhesive applied on the panel element and the exterior surface of the connecting flange at marked locations of the connecting flange in the course of temporary mechanical fixation.

After uniting and final positioning of the preformed part with the panel element it is therefore only necessary to wait until the quick-setting adhesive has set. At this time the temporary mechanical fixation can be removed and the joined parts can harden. The device used for mechanical fixation is then available for the connection of a further panel element with a preformed part.

Further embodiments and advantageous embodiments of the air conduit arrangement and the method for its production ensue from the claims, the further description and the drawings illustrating an exemplary embodiment.

DETAILED DESCRIPTION OF THE INVENTION

Figure 1:
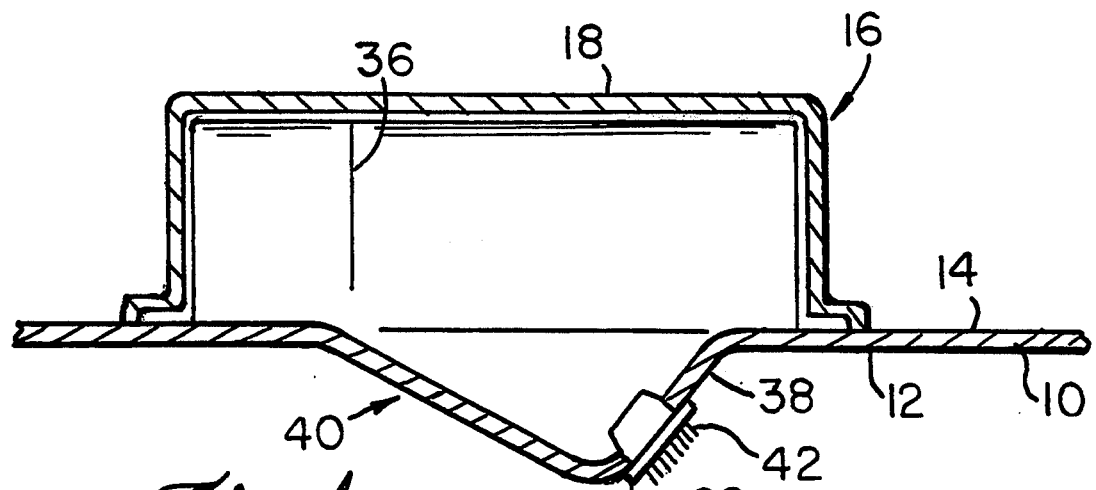
FIG. 1 a cross section through an air conduit arrangement.

A cross section through an air conduit arrangement formed by gluing a panel element 10 to a thermoplastic preformed part 18 is shown in FIG. 1. The panel element is located near the wall of a body, not shown, and its decorated side 12 faces the vehicle interior. It supports the preformed part 18, which is embodied as a U-shaped profile, on its back 14.

The air conduit 16 formed in this way supplies fresh air or conditioned air from a fan or an air conditioning device to one or a plurality of air outlets 28 recessed in the panel element 10.

Figure 2:
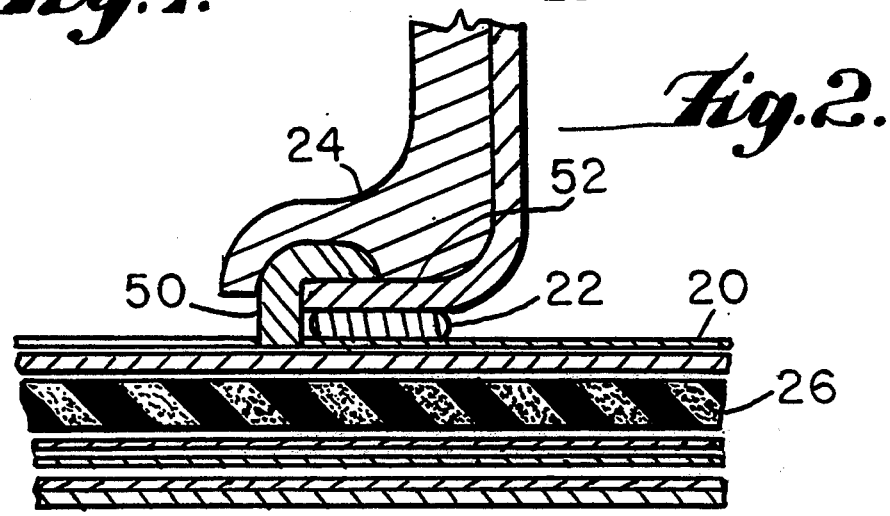
FIG. 2 a detailed cross section from FIG. 1.

The thermoplastic preformed part 18 consists of a material impervious to air and vapor, preferably of acryl-butadiene-styrene (ABS). The panel element 10 has on its back 14 a layer of foil 20 impervious to air and vapor, preferably of polyethylene (PE), as can be seen in the detailed view in FIG. 2. An adhesive layer 22 of a permanently resilient adhesive is placed between a flange 52 of the preformed part 18 and the panel element 22. It consists of an airtight rot-proof material, preferably of a humidity cross-linking polyurethane.

In addition, the thermoplastic preformed part 18 has an insulating mat 24 on the outside for sound and heat insulation. This, too, is glued together with the preformed part 18 and the panel element 10. A corresponding additional insulating mat is not required on the side of the panel element. Here, a foamed-on support core 26 in the interior of the panel element 10 takes the function of sound and heat insulation. Furthermore, a tacking point 50 formed by a quick-setting adhesive can be seen in FIG. 2. As can be seen in connection with FIG. 3, a plurality of these tacking points 50 is disposed along the connecting flange 52. They are used to fix the mutual position of the thermoplastic preformed part 18 and the panel element 10 after their joining, until the permanently resilient adhesive has set.

Figure 3:
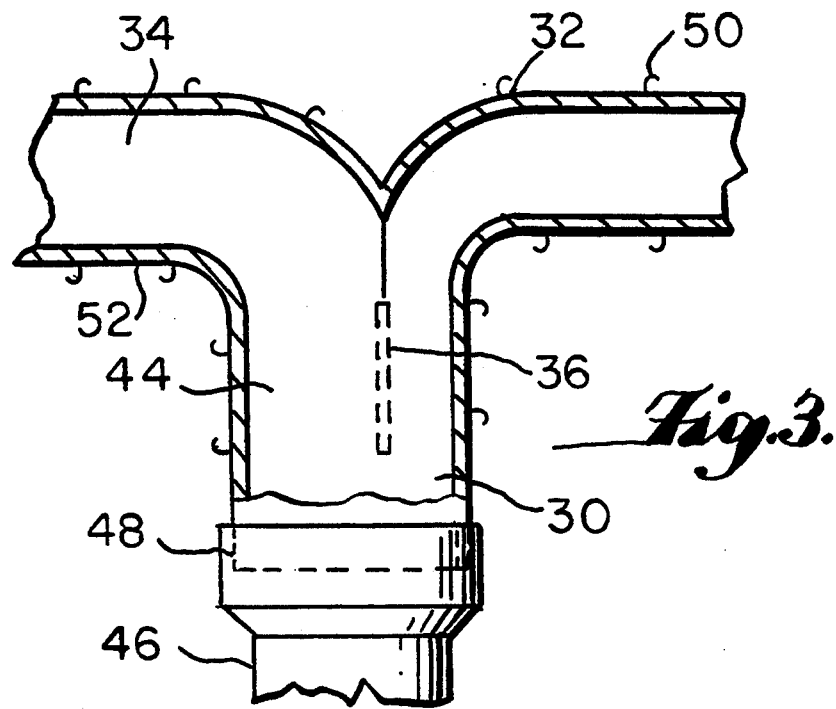
FIG. 3 a top view of the back of a panel element in the area of an air conduit arrangement.

If it is intended to supply a plurality of air outlets 28, which are disposed spatially apart from each other, by means of the air conduit arrangement, the air can first be supplied via a common main conduit 30, from which side conduits 32 and 34 then branch off, as indicated in FIG. 3. In this case the air conduits 16 each have a conduit cross section which, in the case of the side conduits 32 and 34, approximately corresponds to the opening cross section of the associated air outlets 28 and, in the case of the main conduit 30, approximately corresponds to the sum of the opening cross sections. As can be further seen from FIG. 1 in connection with FIG. 3, air guide baffles 36 are disposed in the main conduits 30 ahead of the branches of the side conduits 32 and 34. These have been formed out of the thermoplastic preformed part 18. With the aid of the air guide baffles 36 it is possible to divide the airflow already ahead of the branches in such a way that it enters the side conduits 32 and 34 without turbulence and to generate the same pressure conditions in all side conduits. An equal supply of all air outlets 28 and an even exit speed at all outlet nozzles is assured by means of this.

As a rule, the air conduits 16 have flat, rectangular conduit cross sections of constant depth. Their width depends on the number of the associated air outlets 28, so that the cross section is respectively proportional to the amount of air conveyed.

As shown in FIG. 1, the air outlets 28 are preferably disposed in the walls 38 of formed beads 40 or troughs of the panel element 10. These air outlets 28 are provided with closable outlet nozzles 42. By means of this arrangement it is possible to achieve in a simple manner the pre-orientation of the exiting air flow.

As can be seen from FIG. 3, the thermoplastic preformed parts 18 can also consist of several joined individual parts 44 and 46. In such a variant, they are connected with each other by bushing-like moldings 48. In this way it is possible to employ uniform basic elements for equipping differing vehicle types, because of which tool expenses can be reduced.

The method of producing the air conduit arrangement proceeds as follows. First, the panel element 10 and the thermoplastic preformed part 18 are separately produced. In this case the panel element 10 consists of a multi-layered initial element which is thermally deformed. The construction of such a panel element is described in DE-OS 36 20 726, for example. For assembly, the panel element 10, with its decorated side 12 facing downward, is placed on a form and the preformed part 18, which previously had been provided on its flanges 52 with an adhesive layer by coating with a permanently resilient adhesive, is prepositioned and placed on the back 14 of the panel element 10. This process can be performed manually and roughly checked by means of a gauge.

Subsequently the final positioning of the thermoplastic preformed part 18 can be performed with the help of a precision tool, in the course of which the parts are again subjected to small dislocations in all three axes. Because of the properties of the slow-drying adhesive, this correction is possible even after the parts have already been joined.

During the mechanical fixation a quick-drying adhesive, for example a heat-sealing adhesive, is applied subsequently at predetermined tacking points which have been recessed, for example, on the pressure surfaces of a fixing gauge, and now acts in the way of an adhesive fixation. The parts joined together can then be removed from the form. Now there is no longer the danger that a relative movement between the panel element and the preformed part can occur during the subsequent setting time of the slow-drying adhesive of approximately eight days.

Before the air conduit arrangement is now stored for setting of the slow-drying adhesive under the effect of humidity, an insulating mat 24 is glued to the thermoplastic preformed part 18, which extends beyond the flange 52 and also is in contact with the panel element 10. In this case a contact glue is used as the adhesive.

We claim:

1. An air conduit system for ventilating or air conditioning a vehicle interior, said interior being partly defined by roof and side body walls, at least of one said roof and side body wall having multilayered, preformed panel elements adjacent thereto, said panel elements having a decorated side facing the vehicle interior and a back with fastening elements facing the roof and side body walls, said system comprising air conduits formed by first and second wall sections, resiliently and permanently glued together at the back of said panel elements wherein the first of said conduit wall sections is formed by the panel elements and the second wall section is formed by a thermoplastic preformed part disposed on the back of said panel elements and said panel elements are fastened by means of the preformed part to at least one of said roof and side body walls.

2. An air conduit system in accordance with claim 1 wherein said thermoplastic preformed part includes a connection flange where said preformed part is glued to said panel elements.

3. An air conduit system in accordance with claim 1, wherein the thermoplastic part consists of a material impervious to air and vapor, that the panel element has on its back a layer of foil impervious to air and vapor, or has an additional foil impervious to air and vapor at least in the area of the air conduit, and that an adhesive layer of a permanently resilient adhesive joining the wall sections consists of an airtight rot-proof material.

4. An air conduit system in accordance with claim 3 wherein said thermoplastic preformed part is composed of acryl-butadiene-styrene (ABS).

5. An air conduit system in accordance with claim 3 wherein said layer of foil is composed of polyethylene (PE).

6. An air conduit system in accordance with claim 3 wherein said permanently resilient adhesive is composed of a humidity cross-linking polyurethane.

7. An air conduit system in accordance with claim 1 further including an insulating mat disposed on the exterior of said thermoplastic preformed part for sound and heat insulation, said mat being glued to said preformed part and said panel element.

8. An air conduit system in accordance with claim 1 further including a foamed-on support core disposed to the interior of said panel element, said support core forming a sound and heat insulating layer.

9. An air conduit system in accordance with claim 1 wherein said air conduits further include air outlets, and said panel elements include one or more recesses which contain said air outlets.

10. An air conduit system in accordance with claim 9 wherein said air conduits include a common main conduit from which branch off side conduits, each of said side conduits leading to one of said air outlets, each of said side conduits having a cross section substantially corresponding to the cross section of said air outlets, and said main conduit having a cross section substantially corresponding to the sum of said air outlet cross sections.

11. An air conduit system in accordance with claim 10 further including air guide baffles disposed in the main conduits preceding said branching off side conduits.

12. An air conduit system in accordance with claim 11 wherein said side conduits are integrally formed from said thermoplastic preformed part.

13. An air conduit system in accordance with claim 10 wherein said air conduits have flat rectangular cross sections of constant depth, the cross sectional width being graduated proportionately in accordance with the total number of said air outlets.

14. An air conduit system in accordance with claim 13 wherein said thermoplastic preformed part has a U-shaped profile, the opening of said U being closed off by attachment to said panel element to form said air conduit.

15. An air conduit system in accordance with claim 13 wherein said panel element has a U-shaped profile and said thermoplastic preformed part is flat, the opening of said U-shaped panel element being closed off by attachment to said flat thermoplastic preformed part to form said air conduit.

16. An air conduit system in accordance with claim 9, wherein said air outlets are disposed in the walls of said panel element by formed beads or in troughs of said panel element, said system further including closeable outlet nozzles located at each air outlet.

17. An air conduit system in accordance with claim 1 wherein said thermoplastic preformed part is segmented, each segment being connected with each other by means of bushing-like moldings.

18. An air conduit system in accordance with claim 1 further including tacking points of a quick-setting glue between said first and second wall sections.

19. An air conduit system in accordance with claim 1 wherein said thermoplastic preformed parts are used as spacers for snap fastenings with said roof and side body walls.

20. A method for producing an air conduit system in accordance with claim 2 comprising the steps of coating said thermoplastic preformed part with a slow-drying permanently resilient adhesive on said connecting flange; positioning said preformed part on the back of said panel element; correcting for proper position of the preformed part in all three axes; and allowing said adhesive to fix.

21. A method in accordance with claim 20 further including the step of fixing said preformed part by adhesive on said panel element at tacking points located on said connecting flange of said preformed part.

22. A method in accordance with claim 21 wherein said adhesive is quick-drying, said method further including the steps of marking said tacking points at locations on said connecting flange; and applying said quick-drying adhesive at said tacking points to temporarily fix said panel element and said exterior surfaces of said preformed part connecting flange.

* * * * *